(12) United States Patent
Guering et al.

(10) Patent No.: US 8,714,484 B2
(45) Date of Patent: May 6, 2014

(54) AIRCRAFT SEAT ASSEMBLY STRUCTURE, AND FITTED FUSELAGE

(75) Inventors: Bernard Guering, Montrabe (FR); Cedric Meyer, Fonsorbes (FR)

(73) Assignee: Airbus Operations S.A.S., Toulouse (FR)

( * ) Notice: Subject to any disclaimer, the term of this patent is extended or adjusted under 35 U.S.C. 154(b) by 389 days.

(21) Appl. No.: 13/062,228

(22) PCT Filed: Sep. 4, 2009

(86) PCT No.: PCT/FR2009/051669
§ 371 (c)(1),
(2), (4) Date: Jul. 15, 2011

(87) PCT Pub. No.: WO2010/026345
PCT Pub. Date: Mar. 11, 2010

(65) Prior Publication Data
US 2011/0260003 A1 Oct. 27, 2011

(30) Foreign Application Priority Data
Sep. 5, 2008 (FR) ...................................... 08 55962

(51) Int. Cl.
*B64D 11/00* (2006.01)
(52) U.S. Cl.
USPC .................................. 244/122 R; 244/118.6
(58) Field of Classification Search
USPC ........ 244/118.6, 122 R; 297/61; D6/356, 357
See application file for complete search history.

(56) References Cited

U.S. PATENT DOCUMENTS

| 2,292,414 | A | * | 8/1942 | Vernon | 297/313 |
| 2,700,412 | A | * | 1/1955 | Evans et al. | 297/232 |
| 2,933,127 | A | * | 4/1960 | Brewster | 297/216.2 |

(Continued)

FOREIGN PATENT DOCUMENTS

| EP | 962355 | * 8/1999 | B60N 2/00 |
| EP | 0 962 355 | 12/1999 | |
| WO | 2007 073938 | 7/2007 | |

OTHER PUBLICATIONS

International Search Report Issued Apr. 6, 2010 in PCT/FR09/051669 filed Sep. 4, 2009.

*Primary Examiner* — Tien Dinh
*Assistant Examiner* — Justin Benedik
(74) *Attorney, Agent, or Firm* — Oblon, Spivak, McClelland, Maier & Neustadt, L.L.P.

(57) ABSTRACT

An aircraft seat assembly structure (4) comprises at least one seat structure (5) that supports at least one seat, with which seat assembly structure is associated a reference frame that is defined by a longitudinal X-axis according to which the seat structure (5) comprises a front part and a rear part, by a Y-axis that is perpendicular to the X-axis, and that forms with said X-axis a horizontal XY plane when at least one seat is horizontal, and by a Z-axis that is perpendicular to the XY plane. In the front part, the seat structure (5) comprises a torsion bar (50) that is essentially parallel to the Y-axis that is equipped at a first lateral end (502) with a front lateral fastening device (500) that is designed to be made integral with lateral attachment means (26) of a shell structure (2) of an aircraft. The invention also relates to a fuselage that comprises said shell structure that is equipped with said lateral attachment means, whereby the aircraft comprises said fuselage and the seat assembly structure (4).

9 Claims, 5 Drawing Sheets

(56) References Cited

U.S. PATENT DOCUMENTS

| | | | | |
|---|---|---|---|---|
| 3,922,034 A | * | 11/1975 | Eggert | 297/216.12 |
| 3,985,388 A | * | 10/1976 | Hogan | 297/216.17 |
| 4,489,978 A | * | 12/1984 | Brennan | 297/232 |
| 4,718,719 A | * | 1/1988 | Brennan | 297/216.2 |
| 5,152,578 A | * | 10/1992 | Kiguchi | 297/216.16 |
| 5,409,186 A | * | 4/1995 | Chow | 244/122 R |
| 5,485,976 A | * | 1/1996 | Creed et al. | 244/118.6 |
| 5,531,404 A | * | 7/1996 | Marechal | 244/118.6 |
| 6,802,568 B1 | * | 10/2004 | Johnson | 297/452.2 |
| 2009/0283636 A1 | * | 11/2009 | Saint-Jalmes et al. | 244/118.5 |
| 2011/0260003 A1 | * | 10/2011 | Guering et al. | 244/122 R |

* cited by examiner

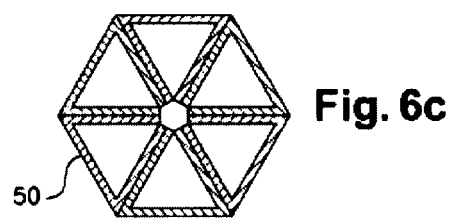
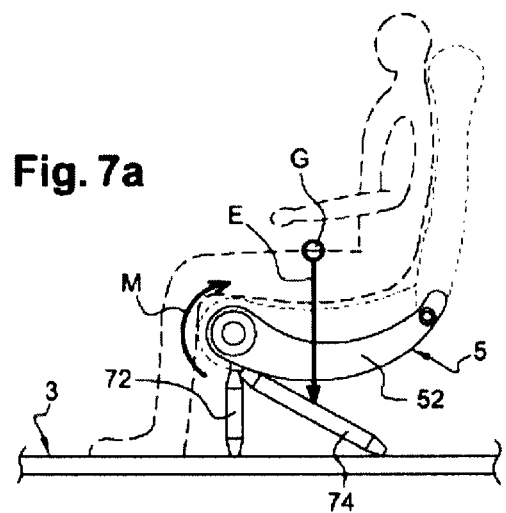
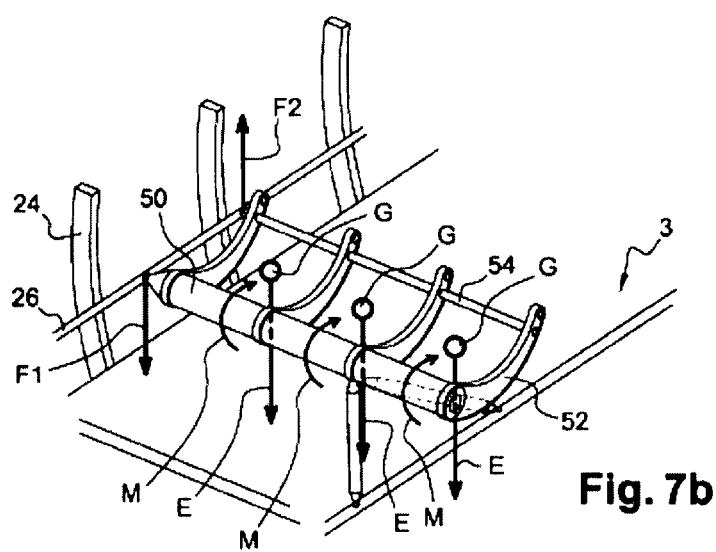

AIRCRAFT SEAT ASSEMBLY STRUCTURE, AND FITTED FUSELAGE

This invention belongs to the field of the manufacturing of aircraft cabin appointments and relates more particularly to a new aircraft seat assembly structure for the production of seat assemblies that are contiguous to a shell structure of the aircraft and that support one or more passengers.

An aircraft is produced by an assembly of load-bearing structures, in particular a fuselage and a wing. In a known manner, a fuselage comprises a shell structure and a deck to which are attached the different seat assembly structures of the passengers.

An aircraft seat assembly structure comprises a seat structure that is extended into a rear part and upward by a back structure, and an underframe combined rigidly with the seat structure, comprising a number of anchoring points to the deck to transmit the forces exerted on said seat assembly structure to said deck of the aircraft.

In addition to one function that consists in ensuring a good level of comfort to the passengers, the seat assembly structures must also be designed to withstand very large mechanical loads and should in particular meet crash-type dynamic tests for which minimum accelerations that have to be supported are defined: for example, 16 g along a longitudinal X-axis of the aircraft, 3 g along a Y-axis that is perpendicular to the X-axis and that forms with the X-axis a horizontal XY plane when the deck is horizontal, and 6 g along a Z-axis that is perpendicular to the XY plane, where g corresponds to the acceleration value of the gravity that is close to 9.81 m/s$^2$.

Figure 1:
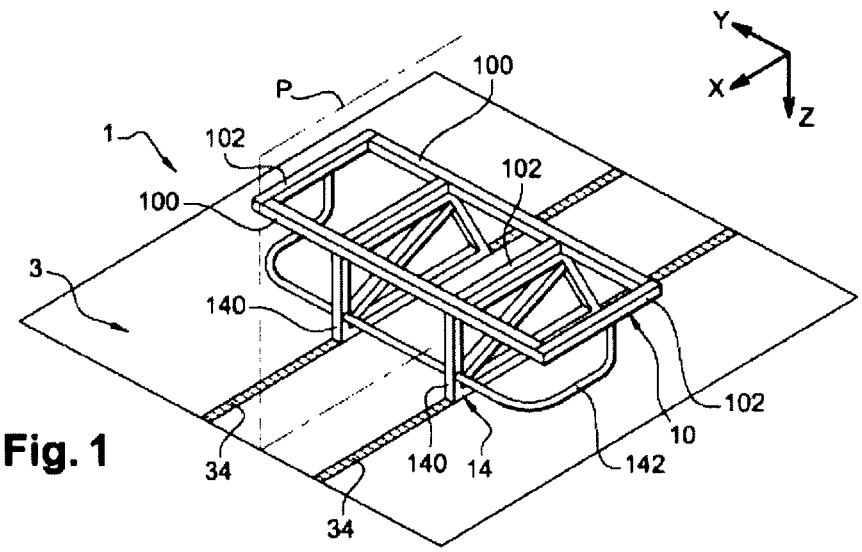

One example that is representative of the current seat assembly structures 1 is illustrated in FIG. 1 for a seat assembly that supports three passengers.

In this example, a seat structure 10 consists of a chassis that is essentially parallel to the XY plane, comprising primarily two crosspieces 100, a front crosspiece and a rear crosspiece, essentially parallel to the Y-axis, which are held relative to one another by longitudinal bars 102 that delimit the seats of different passengers, two outer bars at the ends of the crosspieces 100 and intermediate bars. The architecture of the seat structure 10 is essentially symmetrical, and the crosspieces 100, on the one hand, and the bars 102, on the other hand, have similar characteristics (length, cross-section, etc.).

An underframe 14 consists of two base structures 140 formed by ribbed frames, for example a framework with oblique bars for forming triangular structures. The base structures 140 are arranged essentially symmetrically relative to a plane P that is perpendicular to the Y-axis, passing through the centers of the crosspieces 100 of the seat structure 10, to ensure a homogeneous transmission of the forces exerted by passengers to a deck 3 of an aircraft, by means of attachment rails 34 of said deck to which said base structures are attached.

To improve the drainage of forces exerted on such seat assembly structures 1, it is common practice to have up to four base structures 140, which requires having an equal number of attachment rails 34 on the deck 3 of the aircraft; this increases the cost/time of manufacturing and assembly and leads to a weight penalty because of a larger number of parts.

For improving the drainage of forces, it is also known to have L-shaped and/or U-shaped support bars 142 that are integral with the base structures 140 and outer bars of the seat structure 10. This solution increases the number and the complexity of parts that form the seat assembly structure 1 and has the same drawbacks as above.

In addition, the current seat assembly structures are heavily influenced by known structures for ground objects and are not optimized based on the environment in which they are placed in the aircraft to drain the forces toward the assembly of the fuselage of the aircraft.

This invention proposes to solve the above-mentioned problems, in particular for the seat assemblies that are contiguous to a shell structure of an aircraft, by means of a seat assembly structure that comprises at least one seat structure that supports at least one seat, with which seat assembly structure is associated a reference frame that is defined by a longitudinal X-axis according to which the seat structure comprises a front part and a rear part, by a Y-axis that is perpendicular to the X-axis and that forms with said X-axis a horizontal XY plane when at least one seat is horizontal, and by a Z-axis that is perpendicular to the XY plane.

According to the invention, in the front part, the seat structure comprises a torsion bar that is essentially parallel to the Y-axis that is equipped at a first lateral end with a front lateral fastening device that is designed to be made integral with a shell structure of the aircraft for transmitting forces exerted on the torsion bar to said shell structure.

The seat assembly structure preferably comprises an underframe that consists of a base structure that is integral with the torsion bar in one half of the torsion bar that comprises a second lateral end on the side that is opposite to the first lateral end.

Advantageously, the base structure comprises at least two non-parallel connecting rods for producing at least two anchoring points on a deck of the aircraft.

To transmit the forces caused by the passengers to the torsion bar, the seat structure comprises a number of longitudinal support arms, each support arm extending from a front end that is integral with the torsion bar in the direction of the rear part of the seat structure.

Preferably, in its rear part, the seat structure also comprises a rear crosspiece that is essentially parallel to the Y-axis that is integral with the support arms that comprises—at a lateral end, located on the side of the first lateral end of the torsion bar—a rear lateral fastening device that is designed to be made integral with the shell structure of the aircraft to improve the lateral drainage of the forces that are undergone to the shell structure.

According to another characteristic of the invention, a primary cross-section of the rear crosspiece has dimensions that are smaller than the dimensions of a primary cross-section of the torsion bar, whereby said primary cross-section of the torsion bar is preferably circular or polygonal in shape and has dimensions that are greater than or equal to 5 centimeters.

Advantageously, the torsion bar, at least, is manufactured from composite material that comprises fibers that are held by a matrix.

Advantageously, the torsion bar of the seat assembly structure is hollow and comprises an inside space, accessible through an opening, suitable for storing one or more lifejackets.

The invention also relates to an aircraft fuselage that comprises a shell structure and a deck. According to the invention, the shell structure also comprises lateral attachment means for the attachment of at least one seat assembly structure, for a lateral uptake of forces undergone by at least one seat assembly structure.

The invention also relates to an aircraft that comprises at least one seat assembly structure and one fuselage according to the invention.

Figure 2:
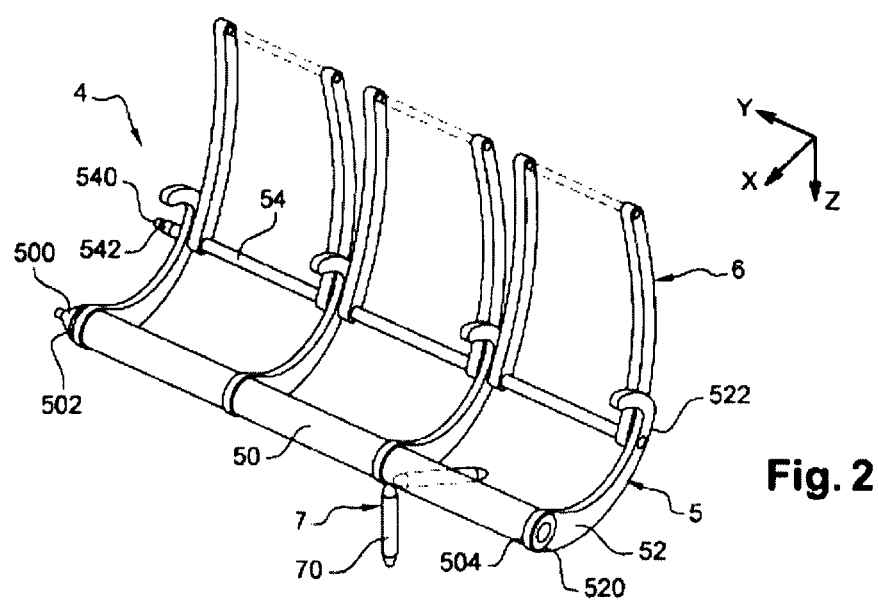
Figure 3:
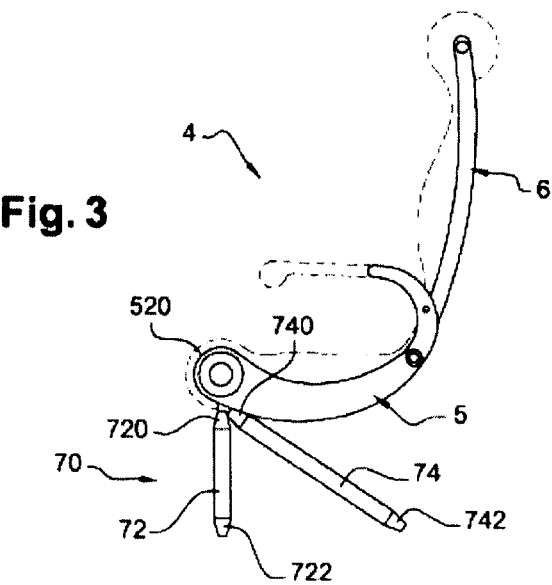
Figure 4:
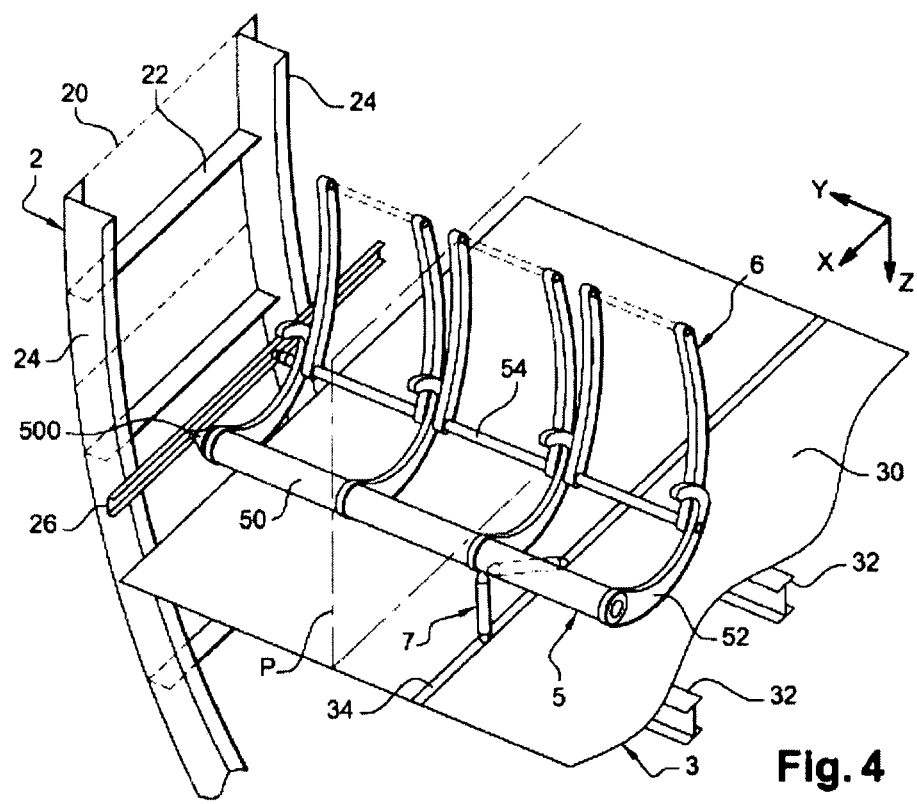
Figure 5:
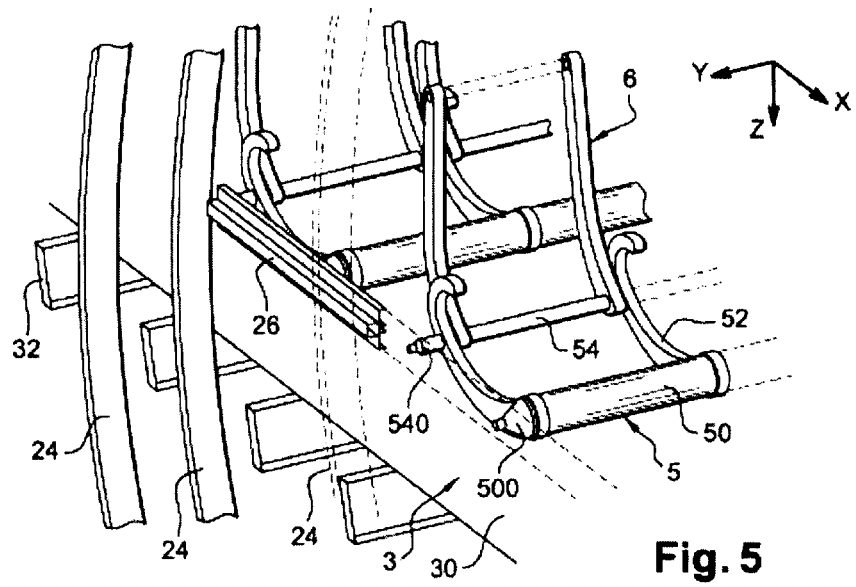
Figure 8:
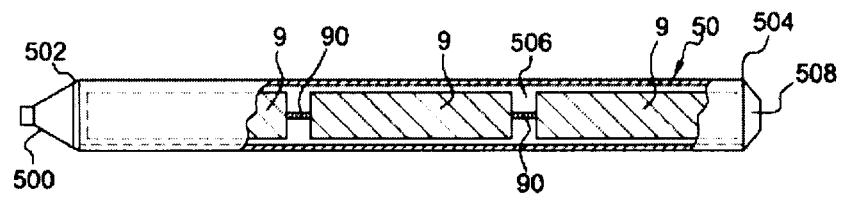
Figure 9A:
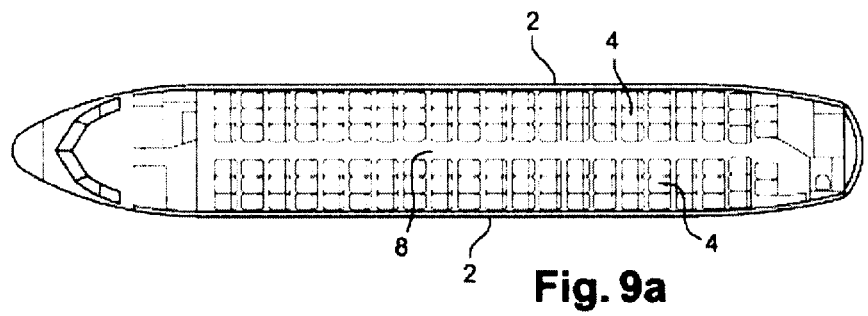
Figure 9B:
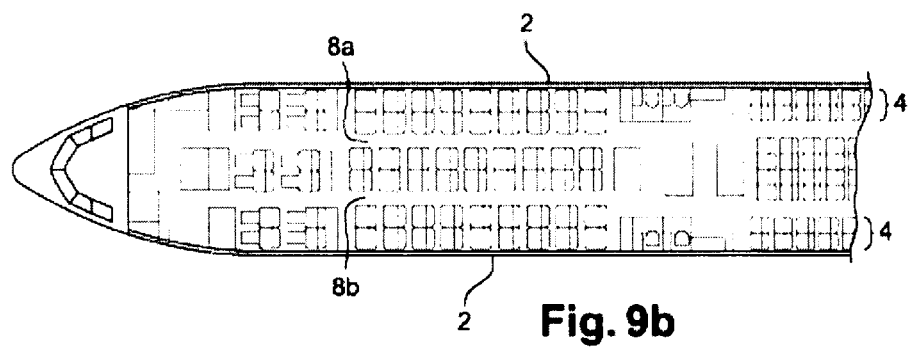

The following description of the modes of the invention is made by referring to the figures, in which identical references designate identical or analogous elements, which show in a nonlimiting manner:

FIG. 1: already cited, an example of a seat assembly structure according to the prior art, FIG. 2: a schematic perspective view of an embodiment of a seat assembly structure according to the invention, FIG. 3: a lateral schematic view of the seat assembly structure of FIG. 2, FIG. 4: a schematic perspective view of the seat assembly structure of FIG. 2 arranged in a fuselage according to an embodiment of the invention, FIG. 5: another schematic perspective view of the seat assembly structure and of the fuselage of FIG. 4, FIGS. 6a, 6b and 6c: schematic views of a primary cross-section of a torsion bar of the seat assembly structure according to three embodiments, FIGS. 7a and 7b: schematic lateral and perspective views that illustrate forces to which the seat assembly structure is subjected when passengers are installed, FIG. 8: a schematic view of a partial cutaway of a torsion bar that comprises an inside space for the storage of lifejackets, FIGS. 9a and 9b: two schematic diagrams that illustrate the seat assemblies covered by the invention respectively in a single-aisle aircraft and a twin-aisle aircraft.

An aircraft comprises a fuselage that comprises at least one shell structure 2 and a deck 3.

In the following description, the aircraft is associated with a reference frame that is defined in a conventional manner by a longitudinal X-axis of the aircraft, a Y-axis that is perpendicular to the X-axis forming with said X-axis a horizontal XY plane when the deck 3 is horizontal, and a Z-axis that is perpendicular to the XY plane.

As shown in particular in FIG. 4, the shell structure 2 in a known way comprises an external skin, composed of panels 20 that are attached to a framing that consists of longitudinal stiffeners, called stringers 22, essentially parallel to the X-axis, and transverse stiffeners, called frames 24, positioned along sections that are essentially perpendicular to the X-axis.

The deck 3 consists of, for example, horizontal panels 30 that are attached to a set of crosspieces 32 that are essentially horizontal and parallel to the Y-axis and that are attached to the shell structure 2 for draining the forces that are linked to the load on the deck 3 to said shell structure.

In the disclosure below, a seat assembly structure 4 according to the invention is described in a reference frame that is associated with said seat assembly structure. For simplifying the disclosure, this reference frame is selected as being coincident with the reference frame that is associated with the aircraft, after mounting said seat assembly structure in said aircraft. For these reasons, one or the other reference frame will be mentioned interchangeably by referring to the X-, Y- and Z-axes, it being understood that the invention is independent of the reference frame used to describe it.

The seat assembly structure 4 according to the invention comprises a seat structure 5, which forms one or more seats of the seat assembly that are, in the selected reference frame, essentially parallel to the XY plane. The seat structure 5 comprises, along the X-axis, a front part and a rear part.

The seat assembly structure 4 also comprises a back structure 6 that extends toward the top the seat structure 5 from its rear part, to form one or more backs of the seat assembly.

The seat structure 5 comprises a torsion bar 50.

As shown in FIG. 2, the torsion bar 50 is located in the front part of the seat structure 5. The torsion bar 50 is transverse, essentially parallel to the Y-axis.

The torsion bar 50, as its name indicates, is subjected to a moment of torsion M, shown in FIGS. 7a and 7b, when passengers are installed on the seat structure 5. Indeed, because the torsion bar 50 is located in the front part of the seat structure 5, the centers of gravity G of the passengers are offset relative to the torsion bar 50, and forces E that are generated by the passengers are transmitted to the torsion bar 50 that is driven in rotation on itself.

The torsion bar 50 comprises a first lateral end 502 and a second lateral end 504, on the side opposite to said first lateral end. At the first lateral end 502, the torsion bar 50 comprises a front lateral fastening device 500 that, in combination with lateral attachment means 26 of the shell structure 2 that are visible in FIGS. 4 and 5, is designed to make the seat structure 5 and said shell structure integral. The lateral attachment means 26 are, for example, a longitudinal attachment rail, essentially parallel to the X-axis and attached to at least two frames 24, to which the front lateral fastening device 500 is attached using clamping means, glue, etc.

In the example that is shown in FIG. 2 and more particularly in FIG. 5, the front lateral fastening device 500 comprises a fastening point and is in the shape of a cone with an axis that is essentially parallel to the Y-axis and with a cross-section of a diameter that decreases in the direction of the first lateral end 502, at the top of which said fastening point is located.

The front lateral fastening device 500 comprises, in another embodiment that is not shown, a number of fastening points for improving the mechanical strength of an interface between the front lateral fastening device 500 and the lateral attachment means 26.

The torsion bar 50 has a cross-section in a plane that is perpendicular to the Y-axis with a shape and dimensions that are essentially constant along the bulk of the length of said torsion bar. The corresponding cross-section is called a primary cross-section of the torsion bar 50. The shape of the primary cross-section is, for example, circular or polygonal.

Figure 6A:
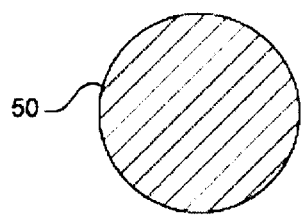
Figure 6B:
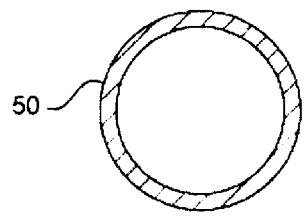

In the case of a primary circular cross-section, the torsion bar 50 is, for example, a solid bar, of which one example of a primary cross-section is illustrated in FIG. 6a, or a hollow tube that comprises an inside diameter and an outside diameter, of which one example of a primary cross-section is illustrated in FIG. 6b.

In the case of a primary polygonal cross-section, for example hexagonal or octagonal, the torsion bar 50 comprises a number of facets that extend along the length of said torsion bar. The facets preferably comprise spokes for connection between each facet. One primary cross-section example of such a torsion bar is shown diagrammatically in FIG. 6c.

The dimensions of the primary cross-section are determined for supporting the bulk of the forces caused by the passengers, of which the center of gravity is offset relative to the torsion bar 50 because the latter is located in the front part of the seat structure 5, and for transmitting them to the shell structure 2. For example, the dimensions of the primary cross-section are greater than or equal to 5 centimeters in all directions. For example, in the case where the torsion bar 50 is a tube with a primary circular cross-section, the outside diameter is greater than or equal to 5 centimeters.

The seat structure 5 preferably also comprises a set of essentially parallel support arms 52.

The support arms 52 are arranged longitudinally in an essentially horizontal manner and preferably delimit the seats of the different passengers. Each support arm 52 comprises a front end 520 of the side of the torsion bar 50, from which said support arm extends toward the rear part of the seat structure 5.

One example of a support arm 52 is more particularly visible in FIG. 3, which shows a side view of the seat assembly structure 4. In this nonlimiting example, each support arm 52 is a convex shape facing downward, i.e., toward the deck 3 after mounting said seat assembly structure.

The front end 520 of each support arm 52 is integral with the torsion bar 50. For example, said front end comprises an opening with dimensions and a shape that are close to those of the primary cross-section of said torsion bar, at which the front end 520 at least partially surrounds the torsion bar 50 and ensures a rigid connection with said torsion bar, preventing in particular the rotations of said support arms. The rigid connection is obtained, for example, by gluing, by serration, because of a use of a primary polygonal cross-section of the torsion bar 50 (which ensures a self-locking in rotation in combination with an opening of a close shape in the front end 520 of the support arm 52) or any other means or combination of means whose purpose is to prevent the rotations of the support arms 52.

The function of the support arms 52 is to ensure the transfer of forces caused by the passengers with the torsion bar 50, which transmits them in turn in particular to the shell structure 2 at the interface between the lateral fastening device 500 and the lateral attachment means 26.

When the passengers are installed on the seat structure 5, the forces E that are generated by the passengers are transmitted to the torsion bar 50 by means of the support arms 52.

The seat assembly structure 4 also comprises an underframe 7 that consists of, in the particular embodiment shown in particular in FIGS. 2 and 4, a base structure 70.

The base structure 70 is combined rigidly with the torsion bar 50 and/or the front end 520 of a support arm 52 in a zone that is located in one-half of said torsion bar, taken along its length, comprising the second lateral end 504 of said torsion bar.

The base structure 70 of the embodiment that is shown essentially comprises two non-parallel connecting rods 72 and 74 that are visible in FIG. 3. Each connecting rod 72, 74 comprises an upper end on the side of the seat structure 5, respectively 720 and 740, and a lower end on the side of the deck 3, respectively 722 and 742, each one designed to produce an anchoring point on the deck 3, for example by attachment to an attachment rail 34.

The connecting rod 72 is essentially parallel to the Z-axis. The connecting rod 74 extends from its upper end 740 in an oblique manner toward the rear and the deck 3.

By making the base structure 70 and the seat structure 5 integral at the torsion bar 50, which is the part of said seat structure that is the most stressed, the forces that are caused by the passengers on said torsion bar are drained effectively toward the deck 3 of the fuselage.

In the embodiment that is described, the underframe 7 comprises a single base structure 70 that reduces the number of attachment rails 34 that are necessary on the deck 3. A reduced number of attachment rails 34 on the deck 3 also reduces the corrosion problems with which such rails are confronted and decreases the mounting time of the seat assembly structure 4 on said deck. In addition, the clutter on the deck is also reduced with a positive impact on the comfort of the passengers.

It should be noted that the underframe 7 is asymmetrical relative to a plane P that is perpendicular to the Y-axis that passes through the center of the torsion bar 50, which is made possible by the fact that the forces are transmitted to the deck 3, via the base structure 70, but also to the shell structure 2, via the front lateral fastening device 500.

In another embodiment that is not shown, the underframe 7 comprises several base structures, which are arranged in a way that may or may not be symmetrical relative to the plane P.

In one particular embodiment, complementary to the modes already described, the seat structure 5 comprises—in the rear part—a rear crosspiece 54. The rear crosspiece 54 is transverse, essentially parallel to the Y-axis, and is linked rigidly to the support arms 52 on the side of their rear ends 522.

The rear crosspiece 54 comprises a rear lateral fastening device 540 at a lateral end 542, on the same side of the seat structure 5 as the front lateral fastening device 500, which is designed to be attached to the lateral attachment means 26 of the shell structure 2 of the fuselage of the aircraft, as illustrated in FIG. 5.

The cross-section of the rear crosspiece 54 is, in a plane that is perpendicular to the Y-axis, of essentially constant shape and dimensions along the bulk of the length of said rear crosspiece. The corresponding cross-section is called the primary cross-section of the rear crosspiece 54. The dimensions of the primary cross-section of the rear crosspiece 54 are smaller than the dimensions of the primary cross-section of the torsion bar 50. The corresponding seat structure 5 is asymmetrical because of the different characteristics of the torsion bar 50 and the rear crosspiece 54.

Because of the rear lateral fastening device 540, the lateral drainage of the forces supported by the seat structure 5 is improved.

When passengers are installed on the seat structure 5, the forces that are generated are taken up in particular by the shell structure 2. As shown in FIG. 7b, the shell structure 2 in this case generates a pair of forces F1 and F2, at the front lateral fastening device 500 and the rear lateral fastening device 540, which balance the moment of torsion M that is generated by the forces E of the passengers.

In a crash scenario with an acceleration forward along the X-axis, for example an acceleration of 16 g, the direction of the moment of torsion M and forces F1 and F2 would be reversed relative to the directions shown in FIGS. 7a and 7b, which illustrate a flight scenario with a 1 g acceleration along the Z-axis.

Advantageously, the back structure 6 is mounted on the rear crosspiece 54, as shown in FIG. 2.

The number of different parts that compose the seat assembly structure 4 according to the invention is smaller than that of the known seat assembly structures, and the parts most often have simple shapes that are compatible with known processes for manufacturing parts made of composite material. In particular, the torsion bar 50 is advantageously manufactured from composite material, such as a composite material that comprises carbon fibers that are held by an epoxy-type resin. In particular, a torsion bar with a primary polygonal cross-section as shown in FIG. 6c is particularly suitable for a production in composite material.

As shown in FIG. 8, when the torsion bar 50 is hollow, for example when it has a primary cross-section as shown in FIG. 6b, the torsion bar 50 comprises a free inside space 506.

This inside space 506 can advantageously be used for the passage of electric cables, for example audio/video cables of the audio/video entertainment system of the cabin, and/or to store one or more lifejackets 9.

In the case where the inside space 506 is used for the storage of lifejackets 9, said inside space is accessible through an opening, preferably at the second lateral end 504 of the torsion bar 50. Preferably, the second lateral end 504 comprises a removable plug 508, making it possible to close off access to the inside space 506 temporarily.

A lifejacket 9, stored in the torsion bar 50, is, for example, rolled up about itself, and advantageously packaged under a slight depression in a plastic package. It is thus possible to reduce the volume of the lifejacket 9 and to adapt its shape to the shape of the inside space 506 of the torsion bar 50 in order to facilitate its insertion/extraction into/from said torsion bar.

Preferably, all of the lifejackets 9 of a seat assembly structure 5 are stored in the torsion bar 50. The lifejackets 9 are then advantageously linked to one another by the same plastic package or by cords 90, such that the extraction of a lifejacket 9 entails the extraction of all of the lifejackets 9 that are stored in the torsion bar 50.

The storage of lifejackets 9 in the inside space 506 of the torsion bar 50 is advantageous relative to the conventional solution of storage under the seats of the seat assembly structures.

Firstly, a space is released under the seat structure 5, making it possible to store luggage, or to improve the comfort of the passengers.

Secondly, the lifejackets 9, protected by the torsion bar 50, do not run the risk of being damaged during storage.

In an emergency, the plug 508 can be withdrawn by a passenger who is close to the second lateral end 504, and the lifejackets can be recovered. In one variant, the lifejackets 9 are ejected automatically, for example by means of a pyrotechnic system.

The invention also relates to an aircraft seat assembly that comprises a seat assembly structure 4 according to the invention.

The invention also relates to an aircraft fuselage that comprises a shell structure 2 and a deck 3 on which seat assembly structures according to the invention are mounted.

In a known manner, the shell structure 2 comprises panels 20 that are stiffened by frames 24 and stringers 22 and also comprises, according to the invention, lateral attachment means 26, for example at least one lateral attachment rail 26 that is attached to at least two frames 24, for the attachment of lateral fastening devices of seat assembly structures according to the invention.

The invention also relates to an aircraft that comprises a fuselage and seat assembly structures 4 according to the invention. The seat assembly structures 4 according to the invention are used for the production of seat assemblies of the aircraft that are contiguous to the shell structure 2.

As shown in FIG. 9a, the seat assembly structure 4 according to the invention is used, for example, for the production of all of the passenger seat assemblies in the case of a single-aisle aircraft that comprises a central aisle 8, because all of the passenger seat assemblies are contiguous to the shell structure 2.

In the case of a twin-aisle aircraft that comprises two aisles 8a and 8b as shown in FIG. 9b, the lateral seat assemblies are produced, for example, by using the seat assembly structure 4 according to the invention. The central seat assemblies, arranged between the aisles 8a and 8b, are not contiguous to the shell structure 2 and are not produced by using the seat assembly structure 4 according to the invention.

The architecture of the seat assembly structures according to the invention is adapted to the environment of said seat assembly structures and makes possible a better distribution of loads (between the deck and the shell structure), in particular in crash scenarios, as well as a better general lateral behavior because of lateral connections to the shell structure. Said seat assembly structures consist of parts with fairly simple geometry that are compatible with use of composite materials, providing a weight savings compared to metallic materials.

The invention claimed is:

1. An aircraft seat assembly structure with at least one seat structure that supports at least one seat, comprising:
   a front part and a rear part, forming a horizontal plane when the at least one seat is horizontal; and
   an underframe,
   wherein the front part includes a torsion bar that is essentially parallel to the horizontal plane, the torsion bar having a first lateral end including a front lateral fastening device that is designed to be attached to a shell structure of an aircraft,
   wherein the underframe includes a base structure that it integral with the torsion bar and is disposed on a second lateral end of the torsion bar, the base structure having two non-parallel connecting rods extending from the torsion bar and forming two anchoring points on a deck of the aircraft, and wherein the two non-parallel connecting rods extending from the torsion bar support all downward forces transferred from the at least one seat structure to the deck.

2. The aircraft seat assembly structure according to claim 1, wherein the seat structure includes a plurality of longitudinal support arms, each of the plurality of longitudinal support arms extending from a front end integral with the torsion bar towards the rear part of the seat structure.

3. The aircraft seat assembly structure according to claim 2, wherein the rear part includes a rear crosspiece that is essentially parallel to the horizontal plane, the rear crosspiece being integral with the plurality of longitudinal support arms, and
   wherein the rear part includes a rear lateral fastening device, at a lateral end located on a side of the first lateral end of the torsion bar, that is designed to be attached to the shell structure of the aircraft.

4. The aircraft seat assembly structure according to claim 3, wherein a primary cross-section of the rear crosspiece has dimensions that are smaller than dimensions of a primary cross-section of the torsion bar.

5. The aircraft seat assembly structure according to claim 1, wherein a primary cross-section of the torsion bar has a circular or polygonal shape, the primary cross-section having dimensions that are greater than or equal to 5 centimeters.

6. The aircraft seat assembly structure according to claim 1, wherein at least the torsion bar is made of a composite material.

7. The aircraft seat assembly structure according to claim 1, wherein the torsion bar includes an inside space that is accessible by an opening, the inside space being suitable for storing one or more lifejackets.

8. An aircraft including at least one seat assembly structure according to claim 1, further comprising a fuselage including the shell structure and the deck,
   wherein the shell structure includes a lateral attachment member to attach the at least one seat assembly structure.

9. The aircraft seat assembly structure according to claim 7, wherein the opening includes a removable plug for sealing the inside space at the second lateral end of the torsion bar.

* * * * *